(12) United States Patent
Kageyama et al.

(10) Patent No.: US 11,905,391 B2
(45) Date of Patent: Feb. 20, 2024

(54) RUBBER COMPOSITION AND TIRE

(71) Applicant: Mitsubishi Gas Chemical Company, Inc., Tokyo (JP)

(72) Inventors: Takuya Kageyama, Tokyo (JP); Maya Okaniwa, Tokyo (JP); Susumu Innan, Tokyo (JP)

(73) Assignee: Mitsubishi Gas Chemical Company, Inc., Tokyo (JP)

( * ) Notice: Subject to any disclaimer, the term of this patent is extended or adjusted under 35 U.S.C. 154(b) by 418 days.

(21) Appl. No.: 17/270,625

(22) PCT Filed: Jul. 11, 2019

(86) PCT No.: PCT/JP2019/027528
§ 371 (c)(1),
(2) Date: Feb. 23, 2021

(87) PCT Pub. No.: WO2020/039788
PCT Pub. Date: Feb. 27, 2020

(65) Prior Publication Data
US 2021/0179810 A1  Jun. 17, 2021

(30) Foreign Application Priority Data

Aug. 24, 2018 (JP) .................. 2018-157531

(51) Int. Cl.
| | | |
|---|---|---|
| *B60C 1/00* | (2006.01) | |
| *C08K 5/31* | (2006.01) | |
| *C08K 3/36* | (2006.01) | |
| *C08K 3/22* | (2006.01) | |
| *C08L 7/00* | (2006.01) | |
| *C08L 9/00* | (2006.01) | |
| *C08K 5/548* | (2006.01) | |

(52) U.S. Cl.
CPC .................. *C08K 5/31* (2013.01); *B60C 1/00* (2013.01); *C08K 3/22* (2013.01); *C08K 3/36* (2013.01); *C08K 5/548* (2013.01); *C08L 7/00* (2013.01); *C08L 9/00* (2013.01); *C08K 2003/2296* (2013.01)

(58) Field of Classification Search
CPC .... B60C 1/00; C08K 5/31; C08K 3/36; C08K 3/22; C08K 5/548; C08L 7/00; C08L 9/00

USPC .......................................... 524/237
See application file for complete search history.

(56) References Cited

U.S. PATENT DOCUMENTS

| | | | |
|---|---|---|---|
| 4,452,692 | A | 6/1984 | Kneissl et al. |
| 5,749,947 | A | 5/1998 | Geke et al. |
| 2010/0105805 | A1 | 4/2010 | Sasaka |
| 2013/0153101 | A1 | 6/2013 | Braun et al. |
| 2016/0145418 | A1 | 5/2016 | Agoretti et al. |
| 2017/0121429 | A1 | 5/2017 | Iwata et al. |
| 2017/0129850 | A1 | 5/2017 | Iwata et al. |
| 2017/0260302 | A1* | 9/2017 | Iwata .................. C08J 3/20 |
| 2018/0355074 | A1 | 12/2018 | Kageyama et al. |

FOREIGN PATENT DOCUMENTS

| | | |
|---|---|---|
| CN | 105408126 A | 3/2016 |
| CN | 106414508 A | 2/2017 |
| EP | 3156426 A1 | 4/2017 |
| JP | S57-192490 A | 11/1982 |
| JP | H10-507231 A | 7/1998 |
| JP | 2013-144797 A | 7/2013 |
| JP | 2016-525168 A | 8/2016 |
| JP | 2017-203071 A | 11/2017 |
| JP | 2018-035325 A | 3/2018 |
| TW | 201602198 A | 1/2016 |
| WO | 2008/123306 A1 | 10/2008 |
| WO | 2015/008265 A1 | 1/2015 |
| WO | 2015/190504 A1 | 12/2015 |
| WO | 2015/190519 A1 | 12/2015 |
| WO | 2016/039276 A1 | 3/2016 |
| WO | WO-2016039276 A1 * | 3/2016 ............... B60C 1/00 |
| WO | 2018/037882 A1 | 3/2018 |
| WO | 2018/043088 A1 | 3/2018 |

OTHER PUBLICATIONS

International Search Report for PCT/JP2019/027528, dated Oct. 8, 2019, and English Translation submitted herewith (5 pages).

\* cited by examiner

*Primary Examiner* — Deve V Hall
(74) *Attorney, Agent, or Firm* — Fitch, Even, Tabin & Flannery LLP

(57) ABSTRACT

The present invention provides a rubber composition comprising: a guanidine fatty acid salt (A), which is a salt of guanidine and a fatty acid; natural rubber and/or synthetic rubber (B); and an inorganic filler (C).

8 Claims, No Drawings

RUBBER COMPOSITION AND TIRE

CROSS-REFERENCE TO RELATED APPLICATIONS

This application is a U.S. national phase application filed under 35 U.S.C. § 371 of International Application Number PCT/JP2019/027528, filed Jul. 11, 2019, designating the United States, which claims priority from Japanese Application Number 2018-157531, filed Aug. 24, 2018.

FIELD OF THE INVENTION

The present invention relates to a rubber composition and a tire comprising the rubber composition.

BACKGROUND OF THE INVENTION

A filler is a compounding ingredient used for the purpose of mixing it with rubber to reinforce the rubber, increase the amount, provide a special function, and so on. Carbon black, a typical filler, not only contributes to the improvement of the mechanical properties, such as elastic modulus and breaking strength, of rubber (reinforcing effect) but also has a function such as providing electrical conductivity.

As a method in which a rubber composition in which a rubber reinforcing effect is obtained like carbon black and the heat-generating properties are low can be obtained, a method using an inorganic filler such as silica is known. The method is applied to rubber compositions for environmentally friendly low fuel consumption tires, and the like.

When an inorganic filler is compounded in a rubber composition in which an inorganic filler is to be compounded, the inorganic filler, particularly hydrophilic silica having silanol groups on the surface, has a low affinity for hydrophobic rubber and aggregates in the rubber composition. Thus, in order to enhance the reinforcing properties of silica and further obtain a lower heat generation effect, the affinity of silica for rubber needs to be enhanced. As methods for that, techniques for compounding a silane coupling agent are developed. In addition, it is known that in order to improve the properties of such a silica-compounded rubber composition, a substance that improves the reactivity of silica with a silane coupling agent is compounded. For example, Patent Literature 1 discloses basic vulcanization accelerators such as diphenylguanidine, 1,3-di-o-tolylguanidine, 1-o-tolylbiguanide, diethylthiourea, and the di-o-tolylguanidine salt of dicatechol borate, as compounds for accelerating the reaction of silica with a silane coupling agent.

In addition, Patent Literatures 2 to 4 disclose rubber compositions for tires in which modified rubber obtained by modification with a compound having strong basicity, aminoguanidine, an alkylidene aminoguanidine, or diaminoguanidine, and an inorganic filling and a silane coupling agent are compounded.

CITATION LIST

Patent Literature

Patent Literature 1: International Publication No. WO 2008/123306
Patent Literature 2: International Publication No. WO 2015/190519
Patent Literature 3: International Publication No. WO 2015/190504
Patent Literature 4: International Publication No. WO 2016/039276

SUMMARY OF INVENTION

However, the use of a guanidine compound having a guanidine skeleton in a rubber composition improves the affinity of the inorganic filler for rubber to contribute to the improvement of the low heat-generating properties, and reinforcing properties of the rubber composition. On the other hand, due to the fact that a guanidine compound having strong basicity accelerates a variety of reactions of components in a rubber composition, the processability of the rubber composition decreases.

It is expected that in the future, the attention of the world to environmental problems such as the carbon dioxide concentration in the air and air pollution will increase more and more. Therefore, there is a need for techniques that can provide a rubber composition that is excellent in low heat-generating properties, and reinforcing properties, while maintaining excellent processability associated with productivity even if an inorganic filler such as silica is added to the rubber composition, and that can provide a tire.

Accordingly, the present invention has been made in view of the above problem of the conventional art, and it is an object of the present invention to provide a rubber composition containing an inorganic filler that is excellent in low heat-generating properties, and reinforcing properties, while maintaining excellent processability associated with productivity, and a tire comprising the rubber composition.

The present inventors have studied diligently and, as a result, found that a rubber composition containing a guanidine fatty acid salt (A), which is a salt of guanidine and a fatty acid, natural rubber and/or synthetic rubber (B), and an inorganic filler (C) solves the above problem, and completed the present invention.

Specifically, the present invention is as follows.

[1]
A rubber composition comprising:
a guanidine fatty acid salt (A), which is a salt of guanidine and a fatty acid;
a natural rubber and/or synthetic rubber (B); and
an inorganic filler (C).

[2]
The rubber composition according to [1], wherein the fatty acid in the guanidine fatty acid salt (A) has 3 or more carbon atoms.

[3]
The rubber composition according to [1], wherein the fatty acid in the guanidine fatty acid salt (A) comprises a fatty acid having 6 to 22 carbon atoms.

[4]
The rubber composition according to any of [1] to [3], wherein a content of the guanidine fatty acid salt (A) is 0.2 to 5.0 parts by mass based on 100 parts by mass of the natural rubber and/or synthetic rubber (B).

[5]
The rubber composition according to [4], wherein the content of the guanidine fatty acid salt (A) is 0.5 to 3.0 parts by mass based on 100 parts by mass of the natural rubber and/or synthetic rubber (B).

[6]
The rubber composition according to any of [1] to [5], wherein the inorganic filler (C) comprises silica.

[7]
The rubber composition according to any of [1] to [6], further comprising a silane coupling agent (D).

[8]
The rubber composition according to any of [1] to [7], further comprising a vulcanizing agent (E).

[9]
A tire comprising the rubber composition according to any of [1] to [8].

According to the present invention, it is possible to provide a rubber composition containing an inorganic filler that is excellent in low heat-generating properties, and reinforcing properties, while maintaining excellent processability associated with productivity, and a tire comprising the rubber composition.

DESCRIPTION OF EMBODIMENTS

An embodiment of the present invention (hereinafter referred to as "this embodiment") will be described in detail below, but the present invention is not limited to this, and various modifications can be made without departing from the spirit thereof.

Rubber Composition

The rubber composition of this embodiment contains the guanidine fatty acid salt (A), which is a salt of guanidine and a fatty acid, the natural rubber and/or synthetic rubber (B) (hereinafter also referred to as a "rubber component (B)"), and the inorganic filler (C) described above.

Guanidine Fatty Acid Salt (A)

The guanidine fatty acid salt (A) is a salt composed of guanidine and a fatty acid. The rubber composition of this embodiment contains the guanidine fatty acid salt (A) and thus is excellent in low heat-generating properties, and reinforcing properties, while maintaining excellent processability associated with productivity. The reason for this is inferred as follows (however, the factor is not limited to this).

In the rubber composition of this embodiment, the guanidine fatty acid salt (A) acts as an internal lubricant and adsorbs on the inorganic filler (C) to lower the polarity of the surface of the inorganic filler (C), thereby improving the affinity of the inorganic filler (C) for the rubber component (B) and the dispersibility of the inorganic filler (C). Particularly, the reaction (silanization reaction) of the polar groups that the inorganic filler (C) can have (particularly in the case of silica, the silanol groups on the silica surface) with a silane coupling agent (D) involving hydrolysis is accelerated by the basic catalytic effect that the guanidine fatty acid salt (A) has. From the above, it is inferred that the rubber composition of this embodiment is excellent in low heat-generating properties, and reinforcing properties.

For the basicity of the guanidine fatty acid salt (A) itself, the strong basicity of guanidine is weakened due to the formation of the salt with the fatty acid, suppressing a variety of reactions between the guanidine fatty acid salt (A), the rubber component (B), and the inorganic filler (C) in the rubber composition, particularly, the excessive reaction between the guanidine fatty acid salt (A) and the silane coupling agent (D), and the excessive crosslinking reaction between the rubber component (B) and the silane coupling agent (D) during mixing and kneading, when the composition of this embodiment contains the silane coupling agent (D). Due to this, the rubber composition of this embodiment is also excellent in processability.

The fatty acid that the guanidine fatty acid salt (A) has is not particularly limited as long as it is a monovalent carboxylic acid to which a chain hydrocarbon that may be branched is bonded. The fatty acid can have the same structure as known saturated fatty acids and unsaturated fatty acids. The fatty acid of the guanidine fatty acid salt (A) is preferably a fatty acid having 3 or more carbon atoms, more preferably a fatty acid having 6 to 22 carbon atoms, further preferably a fatty acid having 8 to 22 carbon atoms, and still further preferably a fatty acid having 12 to 18 carbon atoms. When the fatty acid of the guanidine fatty acid salt (A) is a fatty acid having 3 or more carbon atoms, the decomposition of the guanidine fatty acid salt (A) due to the volatilization of the fatty acid during mixing and kneading is suppressed, and the action and effect of the present invention can be reliably achieved. When the fatty acid of the guanidine fatty acid salt (A) is a fatty acid having 6 to 22 carbon atoms, the compatibility with the rubber component (B) and the inorganic filler (C) interface with the rubber component (B) improves, the dispersion of the inorganic filler (C) is accelerated, and the action and effect of the present invention can be more reliably achieved.

"Having . . . carbon atoms" with respect to the fatty acid herein refers to the total number of carbon atoms of the carboxylic acid and carbon atoms of the chain hydrocarbon, and also includes the carbon atoms of the hydrocarbon in the branched portion when the chain hydrocarbon is branched.

Examples of the fatty acid include saturated fatty acids and unsaturated fatty acids, for example, straight-chain saturated fatty acids and branched-chain saturated fatty acids, acetic acid, propionic acid, butyric acid, hexanoic acid, caproic acid, octylic acid, caprylic acid, capric acid, lauric acid, myristic acid, palmitic acid, stearic acid, isostearic acid, arachidic acid, and behenic acid; and straight-chain unsaturated fatty acids and branched-chain unsaturated fatty acids, acrylic acid, methacrylic acid, crotonic acid, myristoleic acid, palmitoleic acid, oleic acid, linoleic acid, linolenic acid, and arachidonic acid. Examples of the fatty acid also include mixed fatty acids derived from fats and oils comprising a plurality of saturated fatty acids, such as palm oil (palm oil comprises large amounts of palmitic acid and oleic acid and also comprises linoleic acid, stearic acid, and myristic acid, and of the palm oil, palm oil comprising 35 to 55% of palmitic acid and 30 to 50% of oleic acid is preferred), beef tallow (beef tallow comprises large amounts of palmitic acid and oleic acid and stearic acid and also comprises linoleic acid and myristic acid), coconut oil (coconut oil comprises large amounts of lauric acid and myristic acid and also comprises palmitic acid, and of the coconut oil, coconut oil comprising 35 to 55% of lauric acid and 10 to 30% of myristic acid is preferred), and palm kernel oil (palm kernel oil comprises large amounts of lauric acid and myristic acid and also comprises palmitic acid, and of the palm kernel oil, palm kernel oil comprising 35 to 55% of lauric acid and 10 to 30% of myristic acid is preferred). Here, the mixed fatty acids should comprise 50% or more of saturated fatty acids and may further comprise unsaturated fatty acids. One of these fatty acids may be used alone, or two or more of these fatty acids may be used in combination. The fatty acid may comprise a hydroxyl group like lactic acid, 12-hydroxystearic acid, and ricinoleic acid. Among these, saturated fatty acids and mixed fatty acids are more preferred. Among the saturated fatty acids, lauric acid, myristic acid, palmitic acid, and stearic acid are further preferred, and lauric acid is particularly preferred. Among the mixed fatty acids, palm oil and coconut oil are preferred, and it is also preferred to use fatty acids contained in fats and oils as they are.

The guanidine that the guanidine fatty acid salt (A) has is not particularly limited and has the same structure as known guanidine.

The guanidine fatty acid salt (A) is not particularly limited, and is obtained, for example, by reacting a guanidine salt with a fatty acid. More specifically, the guanidine fatty acid salt (A) is obtained by stirring guanidine carbonate and a fatty acid in a polar solvent such as water or an alcohol at atmospheric pressure at 0° C. to 100° C., preferably room temperature (20° C.) to 80° C., for approximately 10 min to 24 h for reaction. After the reaction, the target compound should be purified by a known method. More specifically, the guanidine fatty acid salt (A) can be obtained by the methods mentioned in Synthesis Examples 1 to 4 in Examples described later.

The guanidine fatty acid salt (A) can also be obtained by a known production method (for example, the method described in MELVIN Z. POLIAKOFF1 AND GILBERT B. L. SMITH, GUANIDINE SOAPS. IND. ENG. CHEM., 40, 335-337 (1948)). More specifically, the guanidine fatty acid salt (A) can be obtained as follows. A fatty acid is dissolved in a solvent (for example, ethyl alcohol or acetone) in an amount about 10 times the mass of the fatty acid, ground guanidine carbonate slightly more excessive than 1:1 molar equivalence to the fatty acid is added, and then the mixture of the fatty acid and guanidine carbonate is gently refluxed for about 2 h to react the fatty acid with guanidine carbonate. Thus, the reaction product can be obtained. The obtained reaction product should be purified by a known method such as filtering the total amount of the obtained reaction product, removing the solvent, and drying the residue in the reaction container under vacuum.

In the above reaction, whether the reaction is completed or not can be confirmed by filtering the obtained reaction product in order to remove the excessive guanidine carbonate, and appropriately titrating with a standard acid or base. Although depending on the type of the fatty acid used, with gentle reflux for about 2 h for reaction as described above, all the fatty acid tends to be able to be reacted with guanidine carbonate.

One guanidine fatty acid salt (A) may be used alone, or two or more guanidine fatty acid salts (A) may be used in combination.

The content of the guanidine fatty acid salt (A) in the rubber composition of this embodiment is preferably 0.2 to 5.0 parts by mass, more preferably 0.3 to 3.0 parts by mass, and further preferably 0.5 to 3.0 parts by mass based on 100 parts by mass of the rubber component (B) described later. When the content of the guanidine fatty acid salt (A) is in the above range, the processability of the rubber composition tends to be able to be improved without impairing excellent low heat-generating properties and excellent reinforcing properties.

Natural Rubber and/or Synthetic Rubber (B)

The natural rubber and/or synthetic rubber (B) is not particularly limited, and examples thereof include natural rubber obtained from rubber trees, and/or synthetic rubber industrially produced from petroleum and the like.

Natural Rubber

The raw material of the natural rubber is not particularly limited, and examples thereof include natural rubber latexes and those having the shapes of sheet rubber and block rubber obtained by coagulating and drying natural rubber latexes. One of these natural rubbers may be used alone, or two or more of these natural rubbers may be used in combination. Examples of the main component of the natural rubber include polyisoprene.

The sheet rubber is not particularly limited, and examples thereof include the sheet rubber described in "International Standards of Quality and Packing for Natural Rubber Grades" (commonly called the Green Book). More specific examples include ribbed smoked sheets (RSS) obtained by drying sheets while smoking them with smoke, air dry sheets (ADS) obtained by hot air-drying sheets, crepe obtained by sufficiently water-washing a coagulate and drying it with hot air, TC rubber (Technically Classified Rubber), SP rubber (Super Processing Rubber), MG rubber, PP crepe, and softening agent- and peptizing agent-added rubber.

The block rubber is not particularly limited, and examples thereof include Standard Malaysian Rubber (SMR) from Malaysia, Standard Indonesian Rubber (SIR) from Indonesia, Thai Tested Rubber (TTR) from Thailand, Standard Singapore Rubber (SSR) from Singapore, Standard Vietnamese Rubber (SVR) from Vietnam, and Standard China Rubber (SCR) from China.

Examples of commercial products of natural rubber include the trade name "RSS #1" manufactured by Kato Sansho Co., Ltd.

Synthetic Rubber

The synthetic rubber is not particularly limited, and examples thereof include diene-based rubber having a double bond in the molecule, such as 1,4-polybutadiene, 1,2-polybutadiene, 1,4-polyisoprene, 3,4-polyisoprene, isobutylene rubber, isoprene-isobutylene rubber, styrene-butadiene rubber, styrene-isoprene rubber, chloroprene rubber, nitrile rubber, propylene-butylene rubber, and ethylene-propylene-diene rubber. The synthetic rubber may be modified diene-based rubber in which an amino group, an alkoxysilane group, a hydroxy group, an epoxy group, a carboxyl group, a cyano group, a halogen, or the like is introduced into the above diene-based rubber, as needed. One of these synthetic rubbers may be used alone, or two or more of these synthetic rubbers may be used in combination.

Examples of commercial products of synthetic rubber include the trade names "TUFDENE E581" and "TUFDENE 2000R" manufactured by Asahi Kasei Corporation.

One rubber component (B) may be used alone, or two or more rubber components (B) may be used in combination.

The content of the rubber component (B) in the rubber composition of this embodiment is preferably 40 to 80% by mass, more preferably 45 to 75% by mass, and further preferably 50 to 70% by mass based on the total amount (100% by mass) of the rubber composition. When the content of the rubber component (B) is within the above range, the rubber composition of this embodiment tends to be better in low heat-generating properties and breaking strength.

Inorganic Filler (C)

The inorganic filler (C) is not particularly limited as long as it is an inorganic filler used in the industry. Examples of the inorganic filler (C) include one or more selected from the group consisting of oxides of silicon, main group metals, or transition metals; hydroxides of silicon, main group metals, or transition metals; hydrates thereof; carbonates of silicon, main group metals, or transition metals; carbon black; and the like.

The inorganic filler (C) can also be classified into reinforcing fillers used for the purpose of enhancing mainly reinforcing properties; and non-reinforcing fillers used for the purpose of an increase in amount and for the purpose of improving processability such as rollability, mainly extrudability. The reinforcing fillers are not particularly limited, and examples thereof include surface-active silica, surface-treated clay, carbon black, mica, calcium carbonate, aluminum hydroxide, aluminum oxide, and titanium oxide. The non-reinforcing fillers are not particularly limited, and examples thereof include calcium carbonate, clay, talc, diatomaceous earth, ground quartz, fused quartz, aluminosilicic acid, organic acid-surface-treated calcium carbonate, magnesium carbonate, zinc carbonate, calcium silicate, and ferric oxide. Among the above, reinforcing fillers are preferred, and among them, silica is more preferred. By using such an inorganic filler (C), the reinforcing properties of the rubber composition tend to improve more, and the affinity of the rubber component (B) for the inorganic filler (C) tends to improve more, and the low loss properties of the obtained rubber molded body tend to be better.

The silica is not particularly limited, and, for example, wet silica (hydrous silicic acid), dry silica (silicic anhydride), and colloidal silica can be used. The BET specific surface area of silica is preferably 40 to 350 $m^2/g$, more preferably 100 to 300 $m^2/g$, and further preferably 150 to 250 $m^2/g$. When the BET surface area of silica is in the above range, the particle diameter of silica is suitable, and the tensile strength of a molded body obtained by molding the rubber composition tends to improve more, and the hysteresis loss tends to decrease more. Examples of commercial products of silica include the trade names "Ultrasil 7000GR" and "Ultrasil VN3" manufactured by Evonik.

Examples of commercial products of carbon black include the trade names "SEAST 9" and "SEAST 7HM" manufactured by Tokai Carbon Co., Ltd., and the trade name "Asahi #70" manufactured by Asahi Carbon Co., Ltd.

One inorganic filler (C) may be used alone, or two or more inorganic fillers (C) may be used in combination.

The content of the inorganic filler (C) in the rubber composition of this embodiment is preferably 10 to 150 parts by mass, more preferably 20 to 125 parts by mass, and further preferably 30 to 100 parts by mass based on 100 parts by mass of the rubber component (B). When the content of the inorganic filler (C) is within the above range, the processability and reinforcing properties of the rubber composition tend to improve more, and the low loss properties of the obtained rubber molded body tend to be better.

Silane Coupling Agent (D)

The rubber composition of this embodiment preferably further contains the silane coupling agent (D). When the rubber composition of this embodiment further contains a silane coupling agent, the affinity of the rubber component (B) for the inorganic filler (C) tends to be more improved by the reaction (silanization) of the inorganic filler (C), particularly silica, with the silane coupling agent (D), and the rubber composition tends to be better in low heat-generating properties, and reinforcing properties.

The silane coupling agent (D) is not particularly limited, and examples thereof include sulfide-based silane coupling agents such as bis(3-triethoxysilylpropyl) tetrasulfide, bis(3-trimethoxysilylpropyl) tetrasulfide, bis(3-methyldimethoxysilylpropyl) tetrasulfide, bis(2-triethoxysilylethyl) tetrasulfide, bis(3-triethoxysilylpropyl) disulfide, bis(3-trimethoxysilylpropyl) disulfide, bis(3-triethoxysilylpropyl) trisulfide, 3-trimethoxysilylpropyl-N, N-dimethylthiocarbamoyl tetrasulfide, 3-trimethoxysilylpropylbenzothiazolyl tetrasulfide, and 3-trimethoxysilylpropylmethacryloyl monosulfide; thio-based silane coupling agents such as 3-hexanoylthiopropyltriethoxysilane, 3-octanoylthiopropyltriethoxysilane, 3-decanoylthiopropyltriethoxysilane, 3-lauroylthiopropyltriethoxysilane, 2-hexanoylthioethyltriethoxysilane, 2-octanoylthioethyltriethoxysilane, 2-decanoylthioethyltriethoxysilane, 2-lauroylthioethyltriethoxysilane, 3-hexanoylthiopropyltrimethoxysilane, 3-octanoylthiopropyltrimethoxysilane, 3-decanoylthiopropyltrimethoxysilane, 3-lauroylthiopropyltrimethoxysilane, 2-hexanoylthioethyltrimethoxysilane, 2-octanoylthioethyltrimethoxysilane, 2-decanoylthioethyltrimethoxysilane, and 2-lauroylthioethyltrimethoxysilane; mercapto-based silane coupling agents such as 3-mercaptopropyltrimethoxysilane, 3-mercaptopropyltriethoxysilane, and 3-mercaptopropylmethyldimethoxysilane; aminosilane-based silane coupling agents such as 3-aminopropyltrimethoxysilane and 3-aminopropyltriethoxysilane; and epoxysilane-based silane coupling agents such as γ-glycidoxypropyltrimethoxysilane and γ-glycidoxypropylmethyldiethoxysilane. Among these, sulfide-based silane coupling agents are preferred.

Examples of commercial products of the silane coupling agent (D) include the trade names "Si69" and "Si75" manufactured by Evonik.

By using the silane coupling agent (D), the affinity of the rubber component (B) for the inorganic filler (C) tends to improve more. One silane coupling agent (D) may be used alone, or two or more silane coupling agents (D) may be used in combination.

The content of the silane coupling agent (D) in the rubber composition of this embodiment is preferably 1 to 25 parts by mass, more preferably 2 to 20 parts by mass, and further preferably 3 to 15 parts by mass based on 100 parts by mass of the inorganic filler (C). When the content of the silane coupling agent (D) is within the above range, the affinity of the rubber component (B) for the inorganic filler (C) tends to improve more.

Vulcanizing Agent (E)

The rubber composition of this embodiment may further contain a vulcanizing agent (E).

The vulcanizing agent (E) is not particularly limited as long as it is one usually used in the industry as a vulcanizing agent used in a rubber composition. Examples of the vulcanizing agent (E) include various types of sulfur generally used as vulcanizing agents, and powdered sulfur, precipitated sulfur, and insoluble sulfur. Examples of commercial products of the vulcanizing agent (E) include the trade name "HK200-1" manufactured by Hosoi Chemical Industry Co., Ltd. One of these vulcanizing agents (E) may be used alone, or two or more of these vulcanizing agents (E) may be used in combination.

The content of the vulcanizing agent (E) in the rubber composition of this embodiment is preferably 0.1 to 5 parts by mass, more preferably 0.5 to 3 parts by mass, based on 100 parts by mass of the rubber component (B). When the content of the vulcanizing agent (E) is 0.1 parts by mass or more, vulcanization proceeds sufficiently. When the content of the vulcanizing agent (E) is 5 parts by mass or less, the occurrence of rubber burst during mixing and kneading tends to be able to be suppressed.

Vulcanization Accelerator (F)

The rubber composition of this embodiment may further contain a vulcanization accelerator (F) in addition to the vulcanizing agent (E). Thus, when the rubber composition is vulcanized, a sufficiently fast vulcanization rate can be obtained. The vulcanization accelerator (F) is not particularly limited, and examples thereof include thiazole-based compounds such as mercaptobenzothiazole and di-2-benzothiazolyl disulfide; sulfenamide-based compounds such as N-cyclohexyl-2-benzothiazolylsulfenamide, N,N'-dicyclohexyl-2-benzothiazolylsulfenamide, and N'-tert-butyl-2-benzothiazolylsulfenamide; guanidine-based compounds such as diphenylguanidine, 1,3-di-o-tolylguanidine, and 1-o-tolylbiguanide; thiuram-based compounds such as tetramethylthiuram disulfide, tetraethylthiuram disulfide, and tetrakis(2-ethylhexyl)thiuram disulfide; and thiourea-based compounds such as N,N'-diphenylthiourea, trimethylthiourea, and N,N'-diethylthiourea. Among these, thiazole-based compounds and/or sulfenamide-based compounds are preferred, and sulfenamide-based compounds are more preferred, because the rate of the vulcanization reaction can be easily adjusted.

Examples of commercial products of the vulcanization accelerator (F) include the trade names "NOCCELER CZ" and "NOCCELER D" manufactured by OUCHI SHINKO CHEMICAL INDUSTRIAL CO., LTD.

One vulcanization accelerator (F) may be used alone, or two or more vulcanization accelerators (F) may be used in combination.

The content of the vulcanization accelerator (F) in the rubber composition of this embodiment is preferably 0.1 to 10 parts by mass based on 100 parts by mass of the rubber component (B).

Other Components

In addition to the above components, the rubber composition of this embodiment may further contain compounding ingredients usually used in the rubber industry, as needed. Such compounding ingredients are not particularly limited, and examples thereof include an antioxidant, a processing aid (for example, a mixture of non-zinc soaps & saturated fatty acid esters), a vulcanization aid (for example, stearic acid and zinc oxide), a lubricant (also referred to as a wax, for example, the trade name "SUNNOC" manufactured by OUCHI SHINKO CHEMICAL INDUSTRIAL CO., LTD), a plastic resin, and an oil. For these compounding ingredients, commercial products can be preferably used.

The type of the antioxidant is not particularly limited, and examples thereof can include naphthylamine-based, p-phenylenediamine-based, hydroquinone derivative, bis-, tris-, and polyphenol-based, diphenylamine-based, quinoline-based, monophenol-based, thiobisphenol-based, and hindered phenol-based antioxidants. In terms of a further antioxidant effect, amine-based antioxidants, p-phenylenediamine-based and diphenylamine-based antioxidants, are preferred. The diphenylamine-based antioxidants are not particularly limited, and examples thereof include 4,4'-bis(α-methylbenzyl)diphenylamine, 4,4'-bis(α, α-dimethylbenzyl)diphenylamine, p-(p-toluenesulfonylamido)diphenylamine, and di(4-octylphenyl)amine. Among these, in terms of a higher antioxidant effect, 4,4'-bis(α-methylbenzyl)diphenylamine is more preferred. The p-phenylenediamine-based antioxidants are not particularly limited, and examples thereof include N,N'-diphenyl-p-phenylenediamine, N-isopropyl-N'-phenyl-p-phenylenediamine, N,N'-di-2-naphthyl-p-phenylenediamine, N-cyclohexyl-N'-phenyl-p-phenylenediamine, N-phenyl-N'-(3-methacryloyloxy-2-hydroxypropyl)-p-phenylenediamine, N,N'-bis(1-methylheptyl)-p-phenylenediamine, N,N'-bis(1, 4-dimethylpentyl)-p-phenylenediamine, N,N'-bis(1-ethyl-3-methylpentyl)-p-phenylenediamine, and N-(1,3-dimethylbutyl)-N'-phenyl-p-phenylenediamine. Among these, in terms of a higher antioxidant effect and cost, N-(1,3-dimethylbutyl)-N'-phenyl-p-phenylenediamine and 2,2,4-trimethyl-1,2-dihydroquinoline polymers are more preferred, and N-(1,3-dimethylbutyl)-N'-phenyl-p-phenylenediamine is further preferred. Examples of commercial products of antioxidants include the trade names "NOCRAC 6C" and "NOCRAC 224" manufactured by OUCHI SHINKO CHEMICAL INDUSTRIAL CO., LTD., and the trade name "ANTAGE 6C" manufactured by Kawaguchi Chemical Industry Co. LTD. The content of the antioxidant in the rubber composition of this embodiment is preferably 0.1 to 5.0 parts by mass based on 100 parts by mass of the rubber component (B).

The type of the above oil is not particularly limited, and examples thereof include mineral oil-based oils derived from petroleum and coal tar, vegetable oil-based oils derived from fatty oils and pine trees, and synthetic resin-based oils. Examples of commercial products of oils include the trade name "ELAMIC 30" manufactured by JX Energy Corporation.

Method for Producing Rubber Composition

Next, a method for producing the rubber composition of this embodiment will be described. The rubber composition of this embodiment has the step of mixing at least the guanidine fatty acid salt (A), the natural rubber and/or synthetic rubber (B), and the inorganic filler (C). For the mixing step, methods common in the industry can be utilized, and, for example, the mixing step comprises three steps, the mastication step of adjusting the plasticity of the rubber component (B) (hereinafter also referred to as a "mastication step"), the non-productive mixing step of mixing the inorganic filler (C) and the like (hereinafter also referred to as a "non-productive mixing step"), and the productive mixing step of mixing compounding ingredients for vulcanization (hereinafter also referred to as a "productive mixing step"). In those steps, other compounding ingredients (the guanidine fatty acid salt (A), the inorganic filler (C), the vulcanizing agent (E), the vulcanization accelerator (F), other components, and the like) can be added to the natural rubber and/or synthetic rubber (B) and mixed in suitable steps. When the adjustment of the degree of polymerization of the rubber component (B) such as synthetic rubber is unnecessary, the mastication step can be omitted. The mastication step, the non-productive mixing step, and the productive mixing step are preferably performed in that order, but these steps may be interchanged as needed.

The guanidine fatty acid salt (A) may be added in any of the mastication step, the non-productive mixing step, or the productive mixing step but is preferably added in non-productive mixing in which the inorganic filler (C) is added and mixed. The adding method is not particularly limited, and examples thereof include a method of adding a powder of the guanidine fatty acid salt (A) as it is, a method of dispersing the guanidine fatty acid salt (A) in a dispersion medium and adding it as a suspension, and a method of dissolving the guanidine fatty acid salt (A) in a solvent and adding it as a solution or an emulsion.

Tire

The tire of this embodiment comprises the rubber composition of this embodiment and particularly preferably comprises the rubber composition of this embodiment in the tread. The tire comprising the rubber composition of this embodiment in the tread is excellent in low fuel consumption properties. The tire of this embodiment is not particularly limited except that it comprises the rubber composition of this embodiment in any of the tire members. The tire of this embodiment can be produced according to an ordinary method. As the gas with which the tire is filled, in addition to usual or oxygen partial pressure-adjusted air, inert gases such as nitrogen, argon, and helium can be used.

EXAMPLES

The present invention will be described in more detail below by giving Examples and Comparative Examples, but the present invention is not limited to the following Examples in any way.

(Synthesis Example 1) Synthesis of Guanidine Laurate 52.09 g (289.1 mmol) of guanidine carbonate, 400 mL of ethanol, and 115.1 g (578.3 mmol) lauric acid were added to a 1 L eggplant type flask and stirred at room temperature using a magnetic stirring bar. After stirring for 2 h, the ethanol was distilled off under reduced pressure. The obtained solid was dissolved in acetone at 40° C. and then cooled to room temperature, and this was filtered, washed, and then vacuum-dried at 50° C. for 5 h to obtain 143.5 g (553.2 mmol) of a white solid. The obtained solid was analyzed by $^1$H-NMR, and it was confirmed that the obtained solid was guanidine laurate ($^1$H-NMR (DMSO-d6, 500 MHz, δ; ppm)=0.9 (t; 3H), 1.1-1.5 (br), 1.9 (t; 2H), 7.0-8.6 (br)). The molar yield was 96%.

(Synthesis Example 2) Synthesis of Guanidine Stearate 39.33 g (218.3 mmol) of guanidine carbonate, 400 mL of ethanol, and 124.2 g (436.6 mmol) of stearic acid were added to a 1 L eggplant type flask and stirred at 50° C. using a magnetic stirring bar. After stirring for 2 h, the ethanol was distilled off under reduced pressure. The obtained solid was dissolved in acetone at 40° C. and then cooled to room temperature, and this was filtered, washed, and then vacuum-dried at 50° C. for 5 h to obtain 143.1 g (416.5 mmol) of a white solid. The obtained solid was analyzed by $^1$H-NMR and confirmed to be guanidine stearate ($^1$H-NMR (CDCl$_3$, 500 MHz, δ; ppm)=0.9 (t; 3H), 1.2-1.4 (br), 2.2-2.3 (br), 7.3-7.7 (br)). In addition, the result of measuring the obtained solid by gas chromatography "GC6890" (trade name manufactured by Agilent) agreed with that of stearic acid being an authentic preparation, in retention time (18.2 min), and therefore it was confirmed that the obtained solid was guanidine stearate. The molar yield was 95%.

(Synthesis Example 3) Synthesis of Guanidine Palm Oil Fatty Acid Salt 5.51 g (30.6 mmol) of guanidine carbonate, 40 mL of ethanol, and 16.38 g (61.2 mmol) of the fatty acids of palm oil (containing 52% of palmitic acid and 31% of oleic acid) were added to a 500 mL eggplant type flask and stirred at 50° C. using a magnetic stirring bar. After stirring for 2 h, the ethanol was distilled off under reduced pressure. The obtained solid was vacuum-dried at 100° C. for 5 h to obtain 20.0 g (74.7 mmol) of a brown solid. The obtained solid was subjected to elemental analysis using a carbon-hydrogen-nitrogen simultaneous determination apparatus "CHN CORDER MT-6" (trade name manufactured by YANACO TECHNICAL SCIENCE). With respect to calculated values for a guanidine palm oil fatty acid salt, C, 65.41; H, 11.93; N, 12.87, the measured values were C, 64.55; H, 11.92; N, 12.66, and therefore it was confirmed that the obtained solid was a guanidine palm oil fatty acid salt. The molar yield was about 99%.

(Synthesis Example 4) Synthesis of Guanidine Coconut Oil Fatty Acid Salt 33.76 g (187.3 mmol) of guanidine carbonate, 105 mL of 2-isopropanol, and 77.94 g (374.6 mmol) of the fatty acids of coconut oil (containing 49% of lauric acid and 17% of myristic acid) were added to a 500 mL eggplant type flask and stirred at 50° C. using a magnetic stirring bar. After stirring for 2 h, the 2-isopropanol was distilled off under reduced pressure. The obtained solid was vacuum-dried at 100° C. for 5 h to obtain 100 g (374.6 mmol) of a brown solid. The obtained solid was subjected to elemental analysis using a carbon-hydrogen-nitrogen simultaneous determination apparatus "CHN CORDER MT-6" (trade name manufactured by YANACO TECHNICAL SCIENCE). With respect to calculated values for a guanidine coconut oil fatty acid salt, C, 60.90; H, 11.38; N, 15.74, the measured values were C, 59.29; H, 11.46; N, 15.17, and therefore it was confirmed that the obtained solid was a guanidine coconut oil fatty acid salt. The molar yield was about 99%.

The details of the components used in the following Examples 1 and 2, Comparative Examples 1 to 4, and Reference Example 1 are shown below. Rubber component: 137.5 parts by mass, synthetic rubber, manufactured by Asahi Kasei Corporation, trade name "TUFDENE E581" (37.5% oil-extended)

Antioxidant: 2 parts by mass, N-phenyl-N'-(1,3-dimethylbutyl)-p-phenylenediamine, manufactured by OUCHI SHINKO CHEMICAL INDUSTRIAL CO., LTD., trade name "NOCRAC 6C"

:1 part by mass, 2,2,4-trimethyl-1,2-dihydroquinoline polymer, manufactured by OUCHI SHINKO CHEMICAL INDUSTRIAL CO., LTD., trade name "NOCRAC 224"

Carbon black: 5 parts by mass, SAF, manufactured by Tokai Carbon Co., Ltd., trade name "SEAST 9"

Oil: 5 parts by mass, T-DAE oil, manufactured by H&R

Silane coupling agent: 6 parts by mass, bis(3-(triethoxysilyl) propyl) tetrasulfide, manufactured by Evonik, trade name "Si69"

Silica: 75 parts by mass, manufactured by Evonik, trade name "Ultrasil 7000GR"

Guanidine laurate: 1.0 part by mass, Synthesis Example 1

Guanidine stearate: 1.0 part by mass, Synthesis Example 2

Diphenylguanidine: 1.0 part by mass, manufactured by TOKYO CHEMICAL INDUSTRY CO., LTD.

Aminoguanidine carbonate: 0.5 part by mass, manufactured by TOKYO CHEMICAL INDUSTRY CO., LTD.

Fatty acid zinc: 2.0 parts by mass, zinc soaps of unsaturated fatty acids, trade name "Struktol A50P", manufactured by Schill+Seilacher Lubricant: 2 parts by mass, selected special wax, manufactured by OUCHI SHINKO CHEMICAL INDUSTRIAL CO., LTD., trade name "SUNNOC"
:2 parts by mass, mixture of non-zinc soaps & saturated fatty acid esters, manufactured by Schill+Seilacher, trade name "Struktol HT207" Vulcanization aid: 2 parts by mass, zinc oxides, two, manufactured by HakusuiTech Co., Ltd.
:1 part by mass, stearic acid, manufactured by NIPPON FINE CHEMICAL CO., LTD.
Vulcanizing agent: 1.6 parts by mass, sulfur, manufactured by Hosoi Chemical Industry Co., Ltd.
Vulcanization accelerator: 2.5 parts by mass, N-cyclohexyl-2-benzothiazolylsulfenamide, manufactured by OUCHI SHINKO CHEMICAL INDUSTRIAL CO., LTD., trade name "NOCCELER CZ"
:1 part by mass, 1,3-diphenylguanidine, manufactured by OUCHI SHINKO CHEMICAL INDUSTRIAL CO., LTD., trade name "NOCCELER D"

Example 1

An unvulcanized rubber composition and a vulcanized rubber composition were made by the following making procedure.
First mixing and kneading: A Banbury mixer (600 mL LABO PLASTOMILL manufactured by Toyo Seiki Seisaku-sho, Ltd.) was used, the rubber component was introduced, and mixing and kneading was started at a number of revolutions of 100 rpm. After 30 s, the vulcanization aids and the antioxidants, and the carbon black and the lubricants were added. 30 s after that, the half amount of the silica covered with the silane coupling agent was introduced, and 60 s after that, the remaining half amount of the silica covered with the oil, the lubricants, and 1.0 part by mass of the guanidine laurate (Synthesis Example 1) were added. Then, at the point in time when the rubber temperature reached 140° C., the cylinder was opened for 1 min. The cylinder was sealed again, and then the mixture was kneaded until the rubber temperature reached 145° C.
Second mixing and kneading: The kneaded material obtained by the first mixing and kneading was cooled to room temperature and then introduced into a Banbury mixer (600 mL LABO PLASTOMILL manufactured by Toyo Seiki Seisaku-sho, Ltd.), and mixing and kneading was performed at a number of revolutions of 100 rpm for 4 min to obtain an unvulcanized rubber composition.
Third mixing and kneading: A 6-in. two-roll mixing and kneading machine was used, and under the conditions of a roll temperature of 50° C. and a number of revolutions of 25 rpm, the vulcanizing agent and the vulcanization accelerators were added to the kneaded material obtained by the second mixing and kneading, and mixing and kneading was carried out.
Press vulcanization: The unvulcanized rubber composition was vulcanized at 160° C. and 10 MPa for 14 min using an oil hydraulic press (manufactured by Oji Machine Co., Ltd.), to obtain a vulcanized rubber composition.

Example 2, Comparative Examples 1 to 4, and Reference Example 1

Except that the compound type of 1.0 part by mass of the guanidine laurate and the amount were changed according to the compositions in the following Table 1, operation was performed as in Example 1 to obtain a variety of unvulcanized rubber compositions and vulcanized rubber compositions.

The details of the components used in the following Examples 3 and 4, Comparative Examples 5 and 6, and Reference Example 2 are shown below. Rubber component: 100 parts by mass, natural rubber, trade name "RSS #1", manufactured by Kato Sansho Co., Ltd.
Silica: 30 parts by mass, manufactured by Evonik, trade name "Ultrasil 7000GR"
Silane coupling agent: 2.4 parts by mass, bis(3-(triethoxysilyl)propyl) tetrasulfide, manufactured by Evonik, trade name "Si69"
Guanidine laurate: 1 part by mass, Synthesis Example 1
Guanidine stearate: 1 part by mass, Synthesis Example 2
Diphenylguanidine: 1 part by mass, manufactured by TOKYO CHEMICAL INDUSTRY CO., LTD.
Aminoguanidine carbonate: 1 part by mass, manufactured by TOKYO CHEMICAL INDUSTRY CO., LTD.
Antioxidant: 2 parts by mass, N-phenyl-N'-(1,3-dimethylbutyl)-p-phenylenediamine, manufactured by Kawaguchi Chemical Industry Co. LTD., trade name "ANTAGE 6C"
Vulcanization aid: 3 parts by mass, two zinc oxides, manufactured by Nippon Chemical Industrial Co., Ltd.
:2 parts by mass, stearic acid (reagent special grade), manufactured by FUJIFILM Wako Pure Chemical Corporation
Carbon black: 30 parts by mass, HAF, manufactured by Asahi Carbon Co., Ltd., trade name "Asahi #70"
Vulcanizing agent: 1.75 parts by mass, sulfur, manufactured by Hosoi Chemical Industry Co., Ltd., trade name "HK200-1"
Vulcanization accelerator: 1 part by mass, N-cyclohexyl-2-benzothiazolylsulfenamide, manufactured by OUCHI SHINKO CHEMICAL INDUSTRIAL CO., LTD., trade name "NOCCELER CZ"
:0.5 parts by mass, 1,3-diphenylguanidine, manufactured by OUCHI SHINKO CHEMICAL INDUSTRIAL CO., LTD., trade name "NOCCELER D"

Example 3

An unvulcanized rubber composition and a vulcanized rubber composition were made by the following making procedure.
Mastication: A Banbury mixer (250 mL LABO PLASTOMILL manufactured by Toyo Seiki Seisaku-sho, Ltd.) was used, and the rubber component was introduced and kneaded for 5 min with the initial number of revolutions set at 20 rpm and the number of revolutions increased to 60 rpm by 20 rpm per minute.
First mixing and kneading: A Banbury mixer (250 mL LABO PLASTOMILL manufactured by Toyo Seiki Seisaku-sho, Ltd.) was used, the rubber component was introduced, and mixing and kneading was started at a number of revolutions of 100 rpm. After 30 s, the half amount of the silica, and the silane coupling agent, and 1 part by mass of the guanidine laurate (Synthesis Example 1) were added. After 30 s, the remaining half amount of the silica, the vulcanization aids, and the antioxidant were introduced. The carbon black was added, and then at the point in time when the rubber temperature reached 140° C., the cylinder was opened for 1 min. The cylinder was sealed again, and then the mixture was kneaded until the rubber temperature reached 145° C.
Second mixing and kneading: A 6-in. two-roll mixing and kneading machine (6 in. high temperature roll manufactured by IKEDAKIKAIKOGYO Co. Ltd.) was used, and under the conditions of a roll temperature of 30° C. and a number of revolutions of 25 rpm, the vulcanizing agent and the vulcanization accelerators were added to the kneaded material obtained by the first mixing and kneading, and mixing and kneading was carried out.

Press vulcanization: The unvulcanized rubber composition was vulcanized at 150° C. in a time 1.5 times t90 in a vulcanization test using an oil hydraulic press (electrothermal press manufactured by Otake Kikai Kogyo K. K.), to obtain a vulcanized rubber composition.

Example 4, Comparative Examples 5 and 6, and Reference Example 2

Except that the compound type of the guanidine laurate was changed according to the compositions in the following Table 2, operation was performed as in Example 3 to obtain a variety of unvulcanized rubber compositions and vulcanized rubber compositions.

The details of the components used in the following Examples 5 and 6, Comparative Examples 7 and 8, and Reference Example 3 are shown.
Rubber component: 100 parts by mass, synthetic rubber, manufactured by Asahi Kasei Corporation, trade name "TUFDENE 2000R" (no oil extension)
Carbon black: 20 parts by mass, HAF, manufactured by Asahi Carbon Co., Ltd., trade name "Asahi #70"
Guanidine laurate: 1 part by mass, Synthesis Example 1
Guanidine stearate: 1 part by mass, Synthesis Example 2
Diphenylguanidine: 1 part by mass, manufactured by TOKYO CHEMICAL INDUSTRY CO., LTD.
Aminoguanidine carbonate: 1 part by mass, manufactured by TOKYO CHEMICAL INDUSTRY CO., LTD.
Silane coupling agent: 4 parts by mass, bis(3-(triethoxysilyl)propyl) tetrasulfide, manufactured by Evonik, trade name "Si69"
Oil: 25 parts by mass, T-DAE oil, manufactured by JX Energy Corporation, trade name "ELAMIC 30"
Silica: 50 parts by mass, manufactured by Evonik, trade name "Ultrasil 7000GR"
Antioxidant: 2 parts by mass, N-phenyl-N'-(1,3-dimethylbutyl)-p-phenylenediamine, manufactured by Kawaguchi Chemical Industry Co. LTD., trade name "ANTAGE 6C"
Vulcanization aid: 2 parts by mass, two zinc oxides, manufactured by Nippon Chemical Industrial Co., Ltd.
:2 parts by mass, stearic acid (reagent special grade), manufactured by FUJIFILM Wako Pure Chemical Corporation
Vulcanizing agent: 1.6 parts by mass, sulfur, manufactured by Hosoi Chemical Industry Co., Ltd., trade name "HK200-1"
Vulcanization accelerator: 2.5 parts by mass, N-cyclohexyl-2-benzothiazolylsulfenamide, manufactured by OUCHI SHINKO CHEMICAL INDUSTRIAL CO., LTD., trade name "NOCCELER CZ"
:1 part by mass, 1,3-diphenylguanidine, manufactured by OUCHI SHINKO CHEMICAL INDUSTRIAL CO., LTD., trade name "NOCCELER D"

Example 5

An unvulcanized rubber composition and a vulcanized rubber composition were made by the following making procedure.
First mixing and kneading: A Banbury mixer (250 mL LABO PLASTOMILL manufactured by Toyo Seiki Seisaku-sho, Ltd.) was used, the rubber component was introduced, and mixing and kneading was started at a number of revolutions of 100 rpm. After 30 s, the carbon black and 1 part by mass of the guanidine laurate (Synthesis Example 1) were introduced, and 30 s after that, the silane coupling agent and the half amount of the silica covered with the oil were introduced. After 60 s, the remaining half amount of the silica covered with the oil was introduced, and at the point in time when the rubber temperature reached 140° C., the cylinder was opened for 1 min. The cylinder was sealed again, and then the mixture was kneaded until the rubber temperature reached 145° C. Second mixing and kneading: The kneaded material obtained by the first mixing and kneading was cooled to room temperature and then introduced into a Banbury mixer (250 mL LABO PLASTOMILL manufactured by Toyo Seiki Seisakusho, Ltd.), and mixing and kneading was started at a number of revolutions of 100 rpm. After 30 s, the half amounts of the vulcanization aids and the antioxidant were introduced, and 15 s after that, the remainder were introduced. The mixture was kneaded until the rubber temperature reached 140° C.
Third mixing and kneading: A 6-in. two-roll mixing and kneading machine (6 in. high temperature roll manufactured by IKEDAKIKAIKOGYO Co. Ltd.) was used, and under the conditions of a roll temperature of 50° C. and a number of revolutions of 25 rpm, the vulcanizing agent and the vulcanization accelerators were added to the kneaded material obtained by the second mixing and kneading, and mixing and kneading was carried out.
Press vulcanization: The unvulcanized rubber composition was vulcanized at 160° C. and 10 MPa in a time 1.1 times t90 in a vulcanization test using an oil hydraulic press (electrothermal press manufactured by Otake Kikai Kogyo K. K.), to obtain a vulcanized rubber composition.

Example 6, Comparative Examples 7 and 8, and Reference Example 3

Except that the compound type of the guanidine laurate was changed according to the compositions in the following Table 3, operation was performed as in Example 5 to obtain a variety of unvulcanized rubber compositions and vulcanized rubber compositions.

The details of the components used in the following Example 7, Comparative Examples 9 and 10, and Reference Example 4 are shown below.
Rubber component: 100 parts by mass, synthetic rubber, manufactured by Asahi Kasei Corporation, trade name "TUFDENE 2000R" (no oil extension)
Carbon black: 5 parts by mass, ISAF-HS, manufactured by Tokai Carbon Co., Ltd., trade name "SEAST 7HM" guanidine palm oil fatty acid salt: 1 part by mass, Synthesis Example 3

Diphenylguanidine: 1 part by mass, manufactured by TOKYO CHEMICAL INDUSTRY CO., LTD.
Aminoguanidine carbonate: 0.5 parts by mass, manufactured by TOKYO CHEMICAL INDUSTRY CO., LTD.
Silane coupling agent: 4 parts by mass, bis(3-(triethoxysilyl)propyl) disulfide, manufactured by Evonik, trade name "Si75"
Oil: 25 parts by mass, T-DAE oil, manufactured by JX Energy Corporation, trade name "ELAMIC 30"
Silica: 50 parts by mass, manufactured by Evonik, trade name "Ultrasil 7000GR"
Antioxidant: 2 parts by mass, N-phenyl-N'-(1,3-dimethylbutyl)-p-phenylenediamine, manufactured by OUCHI SHINKO CHEMICAL INDUSTRIAL CO., LTD., trade name "NOCRAC 6C"

Vulcanization aid: 2 parts by mass, two zinc oxides, manufactured by Nippon Chemical Industrial Co., Ltd.
:2 parts by mass, stearic acid (reagent special grade), manufactured by FUJIFILM Wako Pure Chemical Corporation
Vulcanizing agent: 1.6 parts by mass, sulfur, manufactured by TOKYO CHEMICAL INDUSTRY CO., LTD. Vulcanization accelerator: 2.5 parts by mass, N-cyclohexyl-2-benzothiazolylsulfenamide, manufactured by OUCHI SHINKO CHEMICAL INDUSTRIAL CO., LTD., trade name "NOCCELER CZ"
:1 part by mass, 1,3-diphenylguanidine, manufactured by OUCHI SHINKO CHEMICAL INDUSTRIAL CO., LTD., trade name "NOCCELER D"

Example 7

An unvulcanized rubber composition and a vulcanized rubber composition were made by the following making procedure.
First mixing and kneading: A Banbury mixer (600 mL LABO PLASTOMILL manufactured by Toyo Seiki Seisaku-sho, Ltd.) was used, the rubber component was introduced, and mixing and kneading was started at a number of revolutions of 100 rpm. After 30 s, the carbon black and 1 part by mass of the guanidine palm oil fatty acid salt (Synthesis Example 3) were introduced, and 60 s after that, the silane coupling agent and the half amount of the silica covered with the half amount of the oil were introduced. Then, the remaining half amount of the silica covered with the remaining half amount of the oil was introduced, and at the point in time when the rubber temperature reached 140° C., the cylinder was opened for 1 min. The cylinder was sealed again, and then the mixture was kneaded until the rubber temperature reached 160° C. Second mixing and kneading: The kneaded material obtained by the first mixing and kneading was cooled to room temperature and then introduced into a Banbury mixer (600 mL LABO PLASTOMILL manufactured by Toyo Seiki Seisakusho, Ltd.), and mixing and kneading was started at a number of revolutions of 100 rpm. After 30 s, the half amounts of the vulcanization aids and the antioxidant were introduced, and 15 s after that, the remainder were introduced. The mixture was kneaded until the mixing and kneading time reached 3 min.
Third mixing and kneading: A 6-in. two-roll mixing and kneading machine (6 in. high temperature roll manufactured by IKEDAKIKAIKOGYO Co. Ltd.) was used, and under the conditions of a roll temperature of 30° C. and a number of revolutions of 25 rpm, the vulcanizing agent and the vulcanization accelerators were added to the kneaded material obtained by the second mixing and kneading, and mixing and kneading was carried out.
Press vulcanization: The unvulcanized rubber composition was vulcanized at 160° C. and 10 MPa in a time 1.1 times t90 in a vulcanization test using an oil hydraulic press (electrothermal press manufactured by Otake Kikai Kogyo K. K.), to obtain a vulcanized rubber composition.

Comparative Examples 9 and 10 and Reference Example 4

Except that the compound type of the guanidine palm oil fatty acid salt was changed according to the compositions in Table 4, operation was performed as in Example 7 to obtain a variety of unvulcanized rubber compositions and vulcanized rubber compositions.
The details of the components used in the following Examples 8 and 9, Comparative Examples 11 and 12, and Reference Example 5 are shown below.

Rubber component: 100 parts by mass, synthetic rubber, manufactured by Asahi Kasei Corporation, trade name "TUFDENE 2000R" (no oil extension)
Carbon black: 5 parts by mass, ISAF-HS, manufactured by Tokai Carbon Co., Ltd., trade name "SEAST 7HM" guanidine coconut oil fatty acid salt: 1 part by mass, Synthesis Example 4

Guanidine laurate: 1 part by mass, Synthesis Example 1
Diphenylguanidine: 1 part by mass, manufactured by TOKYO CHEMICAL INDUSTRY CO., LTD.
Aminoguanidine carbonate: 1 part by mass, manufactured by TOKYO CHEMICAL INDUSTRY CO., LTD.
Silane coupling agent: 4.8 parts by mass, bis(3-(triethoxysilyl)propyl) disulfide, manufactured by Evonik, trade name "Si75"
Oil: 25 parts by mass, T-DAE oil, manufactured by JX Energy Corporation, trade name "ELAMIC 30"
Silica: 60 parts by mass, manufactured by Evonik, trade name "Ultrasil VN3"
Antioxidant: 2 parts by mass, N-phenyl-N'-(1,3-dimethylbutyl)-p-phenylenediamine, manufactured by OUCHI SHINKO CHEMICAL INDUSTRIAL CO., LTD., trade name "NOCRAC 6C"
Vulcanization aid: 2 parts by mass, two zinc oxides, manufactured by Nippon Chemical Industrial Co., Ltd.
:2 parts by mass, stearic acid (reagent special grade), manufactured by FUJIFILM Wako Pure Chemical Corporation
Vulcanizing agent: 1.6 parts by mass, sulfur, manufactured by TOKYO CHEMICAL INDUSTRY CO., LTD. Vulcanization accelerator: 2.5 parts by mass, N-cyclohexyl-2-benzothiazolylsulfenamide, manufactured by OUCHI SHINKO CHEMICAL INDUSTRIAL CO., LTD., trade name "NOCCELER CZ"
:1 part by mass, 1,3-diphenylguanidine, manufactured by OUCHI SHINKO CHEMICAL INDUSTRIAL CO., LTD., trade name "NOCCELER D"

Example 8

An unvulcanized rubber composition and a vulcanized rubber composition were made by the following making procedure.
First mixing and kneading: A Banbury mixer (600 mL LABO PLASTOMILL manufactured by Toyo Seiki Seisaku-sho, Ltd.) was used, the rubber component was introduced, and mixing and kneading was started at a number of revolutions of 100 rpm. After 30 s, the carbon black and 1 part by mass of the guanidine coconut oil fatty acid salt (Synthesis Example 4) were introduced, and 60 s after that, the silane coupling agent and the half amount of the silica covered with the half amount of the oil were introduced. Then, the remaining half amount of the silica covered with the remaining half amount of the oil was introduced, and at the point in time when the rubber temperature reached 140° C., the cylinder was opened for 1 min. The cylinder was sealed again, and then the mixture was kneaded until the rubber temperature reached 160° C. Second mixing and kneading: The kneaded material obtained by the first mixing and kneading was cooled to room temperature and then introduced into a Banbury mixer (600 mL LABO PLASTOMILL manufactured by Toyo Seiki Seisakusho, Ltd.), and mixing and kneading was started at a number of revolutions of 100 rpm. After 30 s, the half amounts of the vulcanization aids and the antioxidant were introduced, and 15 s after that, the remainder were introduced. The mixture was kneaded until the mixing and kneading time reached 3 min.
Third mixing and kneading: A 6-in. two-roll mixing and kneading machine (6 in. high temperature roll manufactured by IKEDAKIKAIKOGYO Co. Ltd.) was used, and under the conditions of a roll temperature of 30° C. and a number of revolutions of 25 rpm, the vulcanizing agent and the vulcanization accelerators were added to the kneaded material obtained by the second mixing and kneading, and mixing and kneading was carried out.

Press vulcanization: The unvulcanized rubber composition was vulcanized at 160° C. and 10 MPa in a time 1.1 times t90 in a vulcanization test using an oil hydraulic press (electrothermal press manufactured by Otake Kikai Kogyo K. K.), to obtain a vulcanized rubber composition.

Example 9, Comparative Examples 11 and 12, and Reference Example 5

Except that the compound type of the guanidine coconut oil fatty acid salt was changed according to the compositions in Table 5, operation was performed as in Example 8 to obtain a variety of unvulcanized rubber compositions and vulcanized rubber compositions.

For the obtained unvulcanized rubber compositions and vulcanized rubber compositions of Examples 1 to 9, Comparative Examples 1 to 12, and Reference Examples 1 to 5, processability, low heat-generating properties, and reinforcing properties were evaluated by the following methods. The results are shown in the following Tables 1 to 5.

(1) Processability

For the above unvulcanized rubber compositions, for the examples in Table 1, the Mooney viscosity ML1+4 [M] of the unvulcanized rubber compositions was measured under the condition of 125° C. using a Mooney viscometer (manufactured by Toyo Seiki Seisaku-sho, Ltd., trade name "AM-4"), in accordance with JIS K 6300-1: 2013 "Rubber, unvulcanized-Physical property-Part 1: Determination of Mooney viscosity and pre-vulcanization characteristics with Mooney viscometer", and using an L-shaped rotor. For the processability of the obtained unvulcanized rubber compositions, the value of the Mooney viscosity ML1+4 [M] of Reference Example 1 in Table 1 was set at 100, and the values of the Mooney viscosity ML1+4 [M] of other Examples and Comparative Examples in the table were calculated as relative values. For the Mooney viscosity ML1+4 [M], a lower value indicates better processability.

For the examples in Table 2 to 5, the Mooney viscosity ML1+4 [M] of the unvulcanized rubber compositions under the condition of 100° C. and the scorch time T5 [min] under the condition of 125° C. were measured using a Mooney viscometer (manufactured by Toyo Seiki Seisaku-sho, Ltd., trade name "AM-4"), in accordance with JIS K 6300-1: 2013 "Rubber, unvulcanized-Physical property-Part 1: Determination of Mooney viscosity and pre-vulcanization characteristics with Mooney viscometer", and using an L-shaped rotor. For the processability of the obtained unvulcanized rubber compositions, the values of the Mooney viscosity ML1+4 [M] and scorch time T5 [min] of the Reference Examples in the tables were each set at 100, and the values of the Mooney viscosity ML1+4 [M] and the values of the scorch time T5 [min] of other Examples and Comparative Examples in the tables were each calculated as a relative value. For the processability Mooney viscosity ML1+4 [M], a lower value indicates better processability, and for the scorch time T5 [min], a larger value indicates better processability.

(2) Low Heat-Generating Properties

For the above vulcanized rubber compositions, the loss tangent (tan δ) was measured at a temperature of 60° C., a strain of 0.5%, and a frequency of 10 Hz using a dynamic viscoelasticity measuring apparatus (manufactured by Seiko Instruments Inc., trade name "DMS6100"). For the low heat-generating properties of the obtained vulcanized rubber compositions, the values of the loss tangent (tan δ) of the Reference Examples were set at 100 in the tables, and the values of the loss tangent (tan δ) of other Examples and Comparative Examples in the tables were calculated as relative values. A smaller value of low heat-generating properties indicates better low heat-generating properties.

(3) Reinforcing Properties

For the above vulcanized rubber compositions, a tensile test was performed in accordance with JIS K6251: 2010 to measure the tensile breaking strength. For the reinforcing properties of the obtained vulcanized rubber compositions, the values of the value "M300" of the tensile breaking strength of the Reference Examples were set at 100 in the tables, and the values "M300" of the tensile breaking strength of other Examples and Comparative Examples in the tables were calculated as relative values. A larger value of reinforcing properties indicates better reinforcing properties.

TABLE 1

|  |  |  | Reference Example 1 | Example 1 | Example 2 | Comparative Example 1 | Comparative Example 2 | Comparative Example 3 | Comparative Example 4 |
|---|---|---|---|---|---|---|---|---|---|
| Guanidine fatty acid salt (A) | Guanidine laurate |  | — | 1.0 | — | — | — | — | — |
|  | Guanidine stearate |  | — | — | 1.0 | — | — | — | — |
| Diphenylguanidine |  |  | — | — | — | 1.0 | — | — | — |
| Aminoguanidine carbonate |  |  | — | — | — | — | 0.5 | — | 0.5 |
| Fatty acid zinc |  |  | — | — | — | — | — | 2.0 | 2.0 |
| Processability | ML1 + 4 | (Relative | 100 | 109 | 105 | 118 | 125 | 93 | 108 |
| Low heat-generating properties | tanδ | values) | 100 | 79 | 80 | 83 | 80 | 92 | 85 |
| Reinforcing properties | M300 |  | 100 | 117 | 114 | 135 | 115 | 79 | 92 |

In the table, the numerical values of the components for formulation indicate parts by mass.

TABLE 2

|  |  |  | Reference Example 2 | Example 3 | Example 4 | Comparative Example 5 | Comparative Example 6 |
|---|---|---|---|---|---|---|---|
| Guanidine fatty acid salt (A) | Guanidine laurate |  | — | 1 | — | — | — |
|  | Guanidine stearate |  | — | — | 1 | — | — |
| Diphenylguanidine |  |  | — | — | — | 1 | — |
| Aminoguanidine carbonate |  |  | — | — | — | — | 1 |
| Relative values | Processability | ML(1 + 4) | 100 | 110 | 102 | 105 | 120 |

TABLE 2-continued

|  |  | Reference Example 2 | Example 3 | Example 4 | Comparative Example 5 | Comparative Example 6 |
|---|---|---|---|---|---|---|
| Processability | T5 | 100 | 84 | 79 | 68 | 58 |
| Low heat-generating properties | tanδ | 100 | 75 | 82 | 89 | 61 |
| Reinforcing properties | M300 | 100 | 115 | 115 | 127 | 121 |

In the table, the numerical values of the components for formulation indicate parts by mass.

TABLE 3

|  |  |  | Reference Example 3 | Example 5 | Example 6 | Comparative Example 7 | Comparative Example 8 |
|---|---|---|---|---|---|---|---|
| Guanidine fatty acid salt (A) | Guanidine laurate |  | — | 1 | — | — | — |
|  | Guanidine stearate |  | — | — | 1 | — | — |
| Diphenylguanidine |  |  | — | — | — | 1 | — |
| Aminoguanidine carbonate |  |  | — | — | — | — | 1 |
| Relative values | Processability | ML(1 + 4) | 100 | 95 | 97 | 97 | 107 |
|  | Processability | T5 | 100 | 90 | 90 | 74 | 65 |
|  | Low heat-generating properties | tanδ | 100 | 81 | 86 | 78 | 78 |
|  | Reinforcing properties | M300 | 100 | 104 | 99 | 113 | 114 |

In the table, the numerical values of the components for formulation indicate parts by mass.

TABLE 4

|  |  | Reference Example 4 | Example 7 | Comparative Example 9 | Comparative Example 10 |
|---|---|---|---|---|---|
| Guanidine palm oil fatty acid salt |  | — | 1 | — | — |
| Diphenylguanidine |  | — | — | 1 | — |
| Aminoguanidine carbonate |  | — | — | — | 0.5 |
| Relative values Processability | ML(1 + 4) | 100 | 77 | 86 | 96 |
| Processability | T5 | 100 | 114 | 84 | 97 |
| Low heat-generating properties | tanδ@60° C. | 100 | 97 | 94 | 86 |

In the table, the numerical values of the components for formulation indicate parts by mass.

TABLE 5

|  |  | Reference Example 5 | Example 8 | Example 9 | Comparative Example 11 | Comparative Example 12 |
|---|---|---|---|---|---|---|
| Guanidine coconut oil fatty acid salt |  | — | 1 | — | — | — |
| Guanidine laurate |  | — | — | 1 | — | — |
| Diphenylguanidine |  | — | — | — | 1 | — |
| Aminoguanidine carbonate |  | — | — | — | — | 1 |
| Relative values Processability | ML(1 + 4) | 100 | 64 | 66 | 70 | 89 |
| Processability | T5 | 100 | 128 | 128 | 96 | 101 |
| Low heat-generating properties | tanδ@60° C. | 100 | 94 | 93 | 87 | 91 |

In the table, the numerical values of the components for formulation indicate parts by mass.

From the results shown in Tables 1 to 5, it was at least confirmed that the rubber compositions containing a guanidine fatty acid salt (A) in the Examples were excellent in low heat-generating properties, and reinforcing properties, while maintaining excellent processability associated with productivity at a level equal to or more than that of the Comparative Examples in which no guanidine fatty acid salt (A) was contained, that is, excellent in the balance of processability, low heat-generating properties, and reinforcing properties.

This application is based on Japanese Patent Application No. 2018-157531 filed with the Japan Patent Office on Aug. 24, 2018, the contents of which are incorporated herein by reference.

The rubber composition according to the present invention can be utilized as materials of various tire members including treads, and the like.

The invention claimed is:

1. A rubber composition comprising:
a guanidine fatty acid salt (A), which is a salt of guanidine and a fatty acid;
a natural rubber and/or synthetic rubber (B); and
an inorganic filler (C), wherein the fatty acid in the guanidine fatty acid salt (A) has 3 or more carbon atoms.

2. The rubber composition according to claim 1, wherein the fatty acid in the guanidine fatty acid salt (A) comprises a fatty acid having 6 to 22 carbon atoms.

3. The rubber composition according to claim 1, wherein a content of the guanidine fatty acid salt (A) is 0.2 to 5.0 parts by mass based on 100 parts by mass of the natural rubber and/or synthetic rubber (B).

4. The rubber composition according to claim 3, wherein the content of the guanidine fatty acid salt (A) is 0.5 to 3.0 parts by mass based on 100 parts by mass of the natural rubber and/or synthetic rubber (B).

5. The rubber composition according to claim 1, wherein the inorganic filler (C) comprises silica.

6. The rubber composition according to claim 1, further comprising a silane coupling agent (D).

7. The rubber composition according to claim 1, further comprising a vulcanizing agent (E).

8. A tire comprising the rubber composition according to claim 1.

* * * * *